United States Patent
Foged

(10) Patent No.: US 10,432,749 B2
(45) Date of Patent: *Oct. 1, 2019

(54) APPLICATION BOOKMARKS AND RECOMMENDATIONS

(71) Applicant: Facebook, Inc., Menlo Park, CA (US)

(72) Inventor: Leif Erik Foged, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 216 days.

This patent is subject to a terminal disclaimer.

(21) Appl. No.: 15/246,225

(22) Filed: Aug. 24, 2016

(65) Prior Publication Data

US 2018/0063276 A1    Mar. 1, 2018

(51) Int. Cl.
| G06F 15/16 | (2006.01) |
| H04L 29/08 | (2006.01) |
| H04L 29/06 | (2006.01) |
| H04W 4/80 | (2018.01) |
| H04W 84/12 | (2009.01) |

(52) U.S. Cl.
CPC ............ *H04L 67/306* (2013.01); *H04L 67/02* (2013.01); *H04L 67/20* (2013.01); *H04L 67/42* (2013.01); *H04W 4/80* (2018.02); *H04W 84/12* (2013.01)

(58) Field of Classification Search
None
See application file for complete search history.

(56) References Cited

U.S. PATENT DOCUMENTS

| 2013/0290905 A1* | 10/2013 | LuVogt | G06N 3/006 715/835 |
| 2013/0298038 A1* | 11/2013 | Spivack | H04L 65/403 715/753 |
| 2014/0040715 A1* | 2/2014 | Younge | G06F 17/24 715/203 |
| 2015/0006294 A1* | 1/2015 | Irmak | G06Q 50/01 705/14.66 |
| 2015/0120717 A1* | 4/2015 | Kim | G06F 16/335 707/727 |
| 2016/0012344 A1* | 1/2016 | Flinn | G06N 5/048 706/52 |
| 2016/0055541 A1* | 2/2016 | Calistri-Yeh | G06F 16/9535 705/14.66 |
| 2016/0099963 A1* | 4/2016 | Mahaffey | H04L 63/1433 726/25 |

(Continued)

*Primary Examiner* — Phyllis A Book
(74) *Attorney, Agent, or Firm* — Baker Botts L.L.P.

(57) ABSTRACT

In one embodiment, a method includes one or more computing devices identifying multiple applications associated with a social-networking system based at least in part on social-networking information for a user associated with the social-networking system. The method also includes calculating, using a machine-learning model and for each of the identified applications, a score based at least in part on a click-through probability that the user will interact with the application upon display of a selectable representation associated with the application, where the machine-learning model is based at least in part on one or more features associated with the user or the application. The method also includes sending, to a client device of the user for display, information to present a selectable representation associated with each of one or more of the identified applications based at least in part on the score for the application.

17 Claims, 6 Drawing Sheets

(56) References Cited

U.S. PATENT DOCUMENTS

2016/0148222 A1* 5/2016 Davar ................ G06Q 30/0201
                                                    705/7.32
2016/0189210 A1* 6/2016 Lacey ................ G06Q 30/0261
                                                    705/7.31
2018/0032583 A1* 2/2018 Koufogiannakis ... G06F 16/951

* cited by examiner

APPLICATION BOOKMARKS AND RECOMMENDATIONS

TECHNICAL FIELD

This disclosure generally relates to presenting information about applications to users.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, the social-networking system may implement one or more services for presenting users information about applications available on the online social network to encourage the users to install or otherwise interact with the presented applications. The social-networking system may dynamically identify or select one or more applications to be presented to a particular user based on information associated with the user or the available applications. It may apply one or more machine-learning techniques in implementing the services according to particular embodiments.

In particular embodiments, for an application that a user has authorized on the online social network, the social-networking system may provide for display to the user a selectable representation of the application to encourage the user to return to or continue to interact with the authorized application. Such a selectable representation may comprise a "bookmark" to access its corresponding application and this functionality of the social-networking system may be called "bookmarks service." In particular embodiments, for an application that has not been authorized by the user on the online social network, the social-networking system may similarly provide for display to the user a selectable representation of the application to encourage the user to try out or install the unauthorized application. Such a selectable representation may comprise a "recommendation" to install its corresponding application and this functionality of the social-networking system may be called "recommendations service."

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
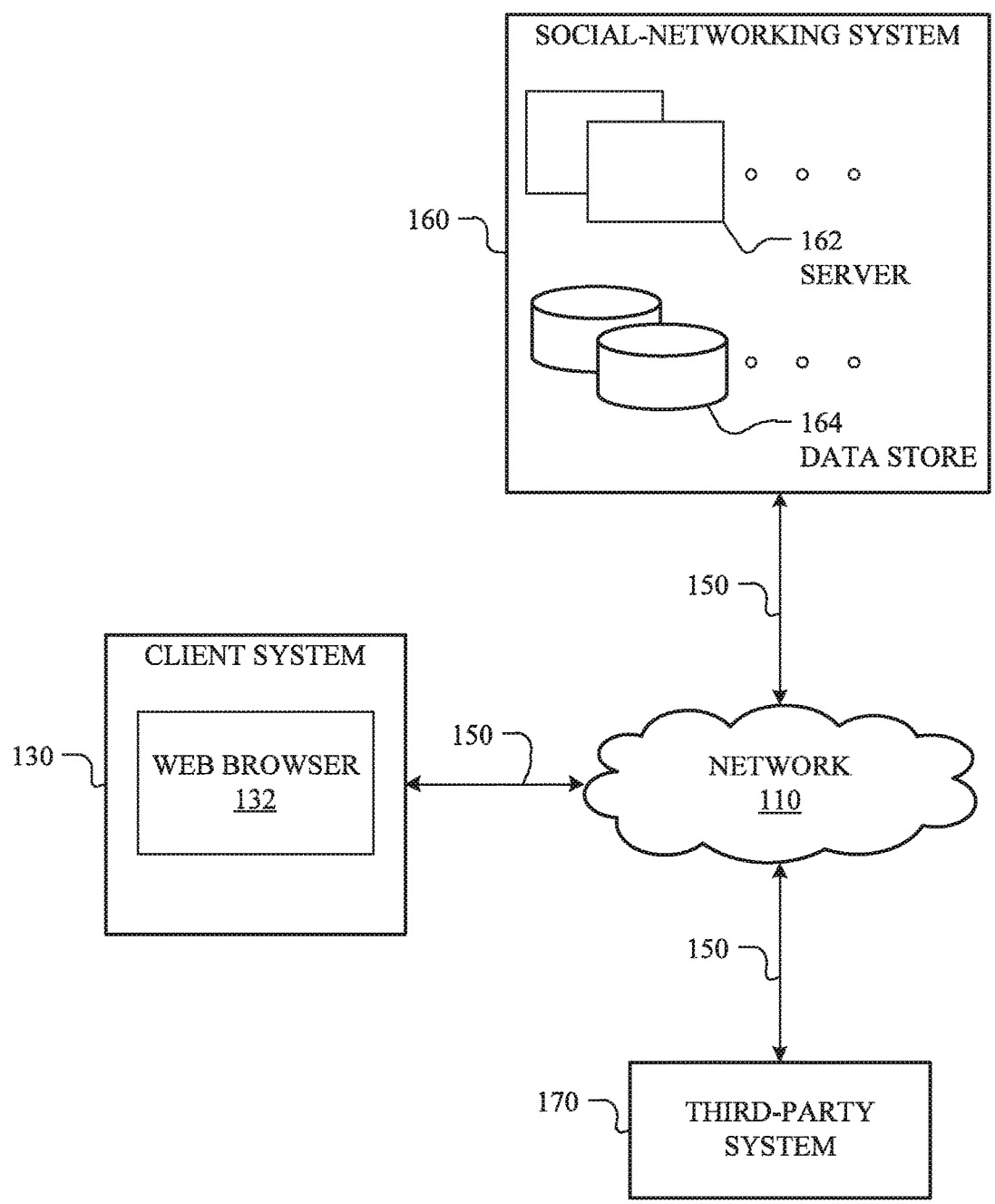
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
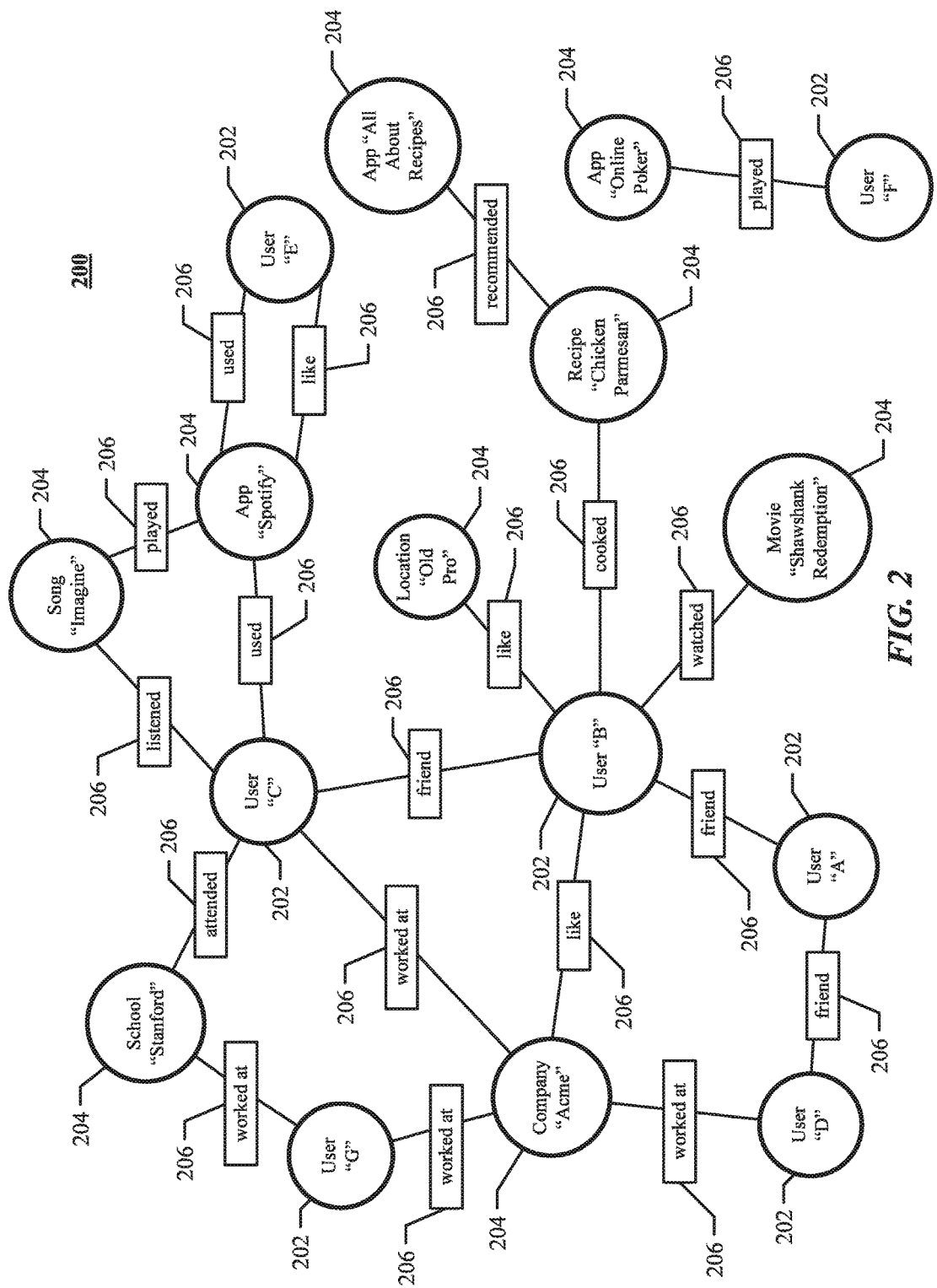
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. As an example and not by way of limitation, an advertisement may display information about a friend of the user within social-networking system 160 who has taken an action associated with the subject matter of the advertisement.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 01 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In particular embodiments, the social-networking system 160 may implement one or more services for presenting users information about applications available on the online social network to encourage the users to install or otherwise interact with the presented applications. The social-networking system 160 may dynamically identify or select one or more applications to be presented to a particular user based on information associated with the user or the available applications. It may apply one or more machine-learning techniques in implementing the services according to particular embodiments.

In particular embodiments, the social-networking system 160 may comprise an applications platform making a plurality of applications available to its users. The applications may be developed by the provider of the social-networking system 160 or one or more third-party developers. The applications may be implemented on one or more servers 162 of the social-networking system 160 or one or more servers associated with third-party systems 170. The applications may belong to one or more categories such as, for example, games, news, utilities, shopping, touring, or another suitable category. A user may authorize an application on the online social network. This may cause the application to be added to a profile or account associated with the user or to be "installed" on the social-networking system 160 in association with the user. The application may be displayed to the user upon login to the online social network. The user's authorization may also cause an executable program associated with the application to be downloaded and installed on a client system 130 associated with the user.

In particular embodiments, for an application that a user has authorized on the online social network, the social-networking system 160 may provide for display to the user a selectable representation of the application to encourage the user to return to or continue to interact with the authorized application. Such a selectable representation may comprise a "bookmark" to access its corresponding application and this functionality of the social-networking system 160 may be called "bookmarks service." In particular embodiments, for an application that has not been authorized by the user on the online social network, the social-networking system 160 may similarly provide for display to the user a selectable representation of the application to encourage the user to try out or install the unauthorized application. Such a selectable representation may comprise a "recommendation" to install its corresponding application and this functionality of the social-networking system 160 may be called "recommendations service."

In particular embodiments, the social-networking system 160 may make the bookmarks service and the recommendations service generally available to applications associated with the online social network. An application may be required to satisfy one or more standards to take advantage of the services. Such standards may comprise, for example, that the application is in a fully functional condition, that the application does not push excessive advertisements to its users (excessiveness may be defined by a threshold frequency of pushed advertisements), that the application does not comprise objectionable images or other content, another suitable requirement, or any combination thereof. In particular embodiments, the social-networking system 160 may seek proper permission from a user before providing the bookmarks or recommendations services to the user. Information to be presented to a particular user based on the bookmarks or recommendations service may be customized based on specific characteristics or preferences of the user. Such customization may be based on one or more calculated probabilities of particular user actions (e.g., click-through, installation) with respect to the applications. The social-networking system 160 may calculate the probabilities using one or more machine-learning models.

In particular embodiments, the social-networking system 160 may provide the bookmarks service by first identifying one or more applications that a user has installed or is currently using via the applications platform associated with the online social network. Then, for each of the identified applications, the social-networking system 160 may calculate a click-through probability that the user will interact with the application (e.g., visit an interface associated with the application) upon display of a selectable representation associated with the application. A score may then be calculated for the identified application based at least in part on the click-through probability. The social-networking system 160 may then rank the identified applications based on their scores and select a specified number of top-ranked applications for display to the user. The number of applications selected may be based on an interface in which information about the applications are to be displayed. As an example and not by way of limitation, the social-networking system 160 may access one or more data stores 164 to identify all applications that a user has authorized on the online social network. The social-networking system 160 may calculate a click-through probability and a corresponding score for the user with respect to each of the identified applications. It may determine, for example, that the user's click-through probabilities with respect to an Events application, a Sale Group application, and a Live Video application are the highest among the identified applications. The social-networking system 160 may then send information to present a bookmark associated with each of the three applications to a client system 130 associated with the user. The user may click on one of the bookmarks and be transferred to an interface associated with its corresponding application.

In particular embodiments, the social-networking system 160 may provide the recommendations service by first identifying a plurality of applications available on the online social network that may be recommended to a user. The identified applications may not have been authorized or used by the user. Then, for each of the identified applications, the social-networking system 160 may separately calculate a click-through probability that the user will interact with the application upon display of a selectable representation associated with the application and an installation probability that the user will install the application upon interacting with the application. A score may then be calculated for the identified application based at least in part on the click-through probability or the installation probability. The social-networking system 160 may then rank the identified applications based on their scores and select a specified number of top-ranked applications for display to the user. The number of applications selected may be based on an interface in which information about the applications are to be displayed. As an example and not by way of limitation, the social-networking system 160 may use the recommendations service to recommend one or more games to a user. The social-networking system 160 may search one or more data stores 164 to identify a plurality of games available on the online social network that have not been played by the user. The social-networking system 160 may calculate a click-through probability, an installation probability, and a corresponding score for the user with respect to each of the identified games. Based on the calculations, the social-networking system 160 may select, for example, fifty games that the user is most likely to eventually install after viewing recommendations about. The social-networking system 160 may then send information to present a recommendation associated with each of the top-fifty games to a client system 130 associated with the user. The user may click on one of the recommendations and be transferred to an interface associated with its corresponding game. The interface may allow the user to, for example, review details of the game, play the game, or install the game. Although this disclosure describes presenting users of a social-networking system 160 selectable representations associated with applications in a particular manner, this disclosure contemplates presenting users of a social-networking system 160 selectable representations associated with applications in any suitable manner.

Figure 3:
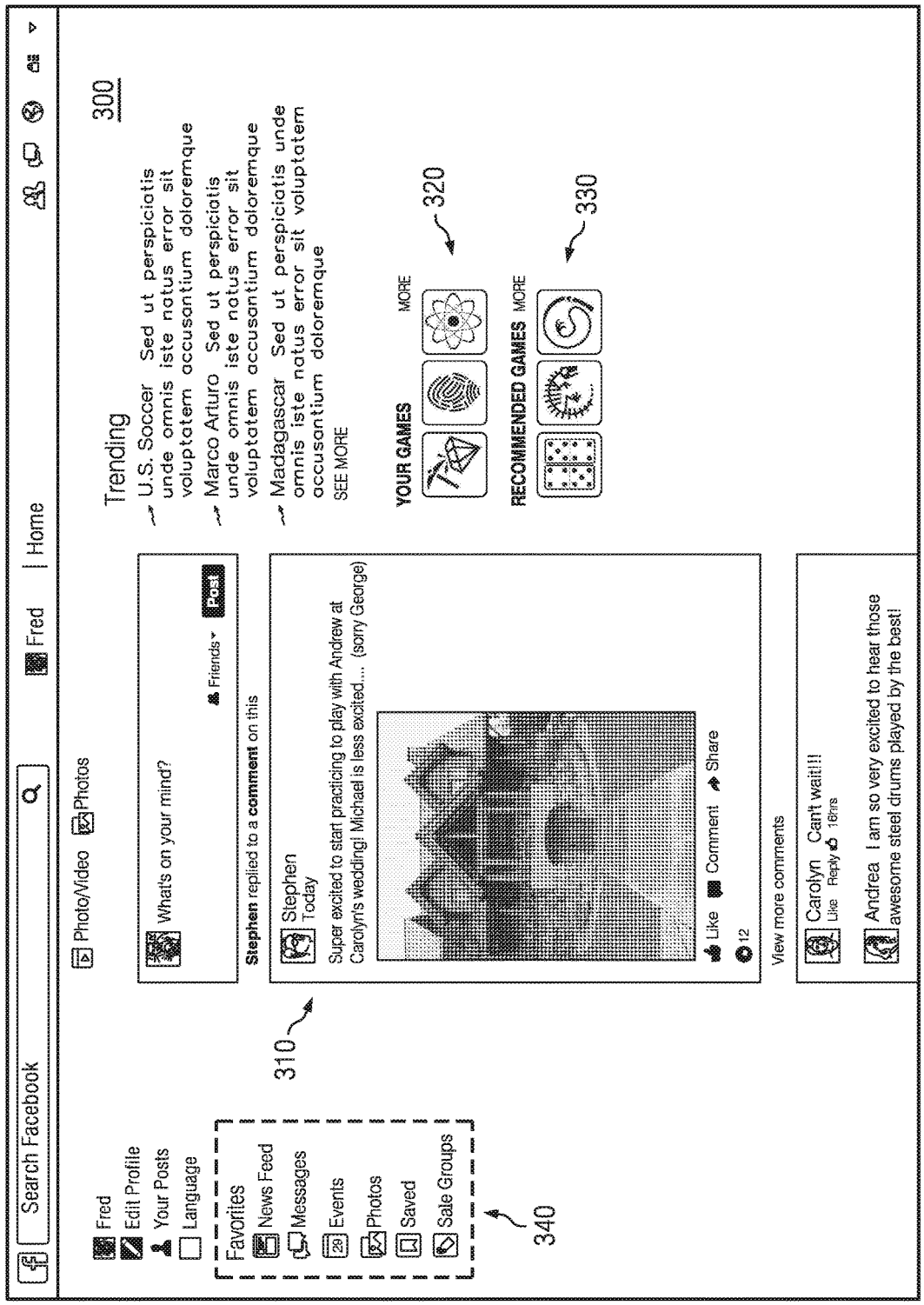
FIG. 3 illustrates an example newsfeed interface displaying bookmarks and recommendations associated with applications.

FIG. 3 illustrates an example newsfeed interface displaying bookmarks and recommendations associated with applications. In particular embodiments, the social-networking system 160 may provide a newsfeed interface 300 for display on a client system 130 associated with a user. The newsfeed interface 300 may be displayed by default as soon as the user logs in the online social network, opens a webpage associated with online social network, or opens an application associated with the online social network. The newsfeed interface 300 may comprise one or more newsfeed content objects 310. It may further comprise one or more fields, each displaying one or more bookmarks or recommendations. The social-networking system 160 may arrange the bookmarks and the recommendations based on one or more categories associated with their corresponding applications.

As an example and not by way of limitation, the social-networking system 160 may display one or more bookmarks 320 associated with games that have been authorized and played by the user on the online social network. The bookmarks 320 may be displayed under a title "Your Games" in a column at the right side of the newsfeed interface 300. Each bookmark 320, for example, may comprise an image from its corresponding game. The user may select one of the bookmarks 320 by clicking on its corresponding image, which may cause the user to be transferred to an interface associated with the game corresponding to the selected bookmark.

As another example and not by way of limitation, the social-networking system 160 may display one or more recommendations 330 about games available on the online social network that have not been authorized by the user. The recommendations 330 may be displayed under a title "Recommended Games" in a column at the right side of the newsfeed interface 300. Each recommendation 330, for example, may comprise an image from its corresponding game. The user may select one of the recommendations 330 by clicking on its corresponding image, which may cause the user to be transferred to an interface associated with the game corresponding to the selected recommendation.

As yet another example and not by way of limitation, the social-networking system 160 may display one or more bookmarks 340 about non-game applications that have been authorized by the user on the online social network. The bookmarks 340 may be displayed under a title "Favorites" in a column at the left side of the newsfeed interface 300. The bookmarks 340 may correspond to applications such as, for example, News Feed, Messages, Events, Photos, Saved, or Sale Groups. Each bookmark 340, for example, may comprise a name of its corresponding application. The user may select one of the bookmarks 340 by clicking on its corresponding name, which may cause the user to be transferred to an interface associated with the application corresponding to the selected bookmark. The interface associated with the application may alternatively be integrated with or superposed on the newsfeed interface 300. Although FIG. 3 illustrates displaying particular selectable representations in a particular user interface in a particular manner, this disclosure contemplates displaying any suitable selectable representations in any suitable user interface in any suitable manner.

Figure 4:
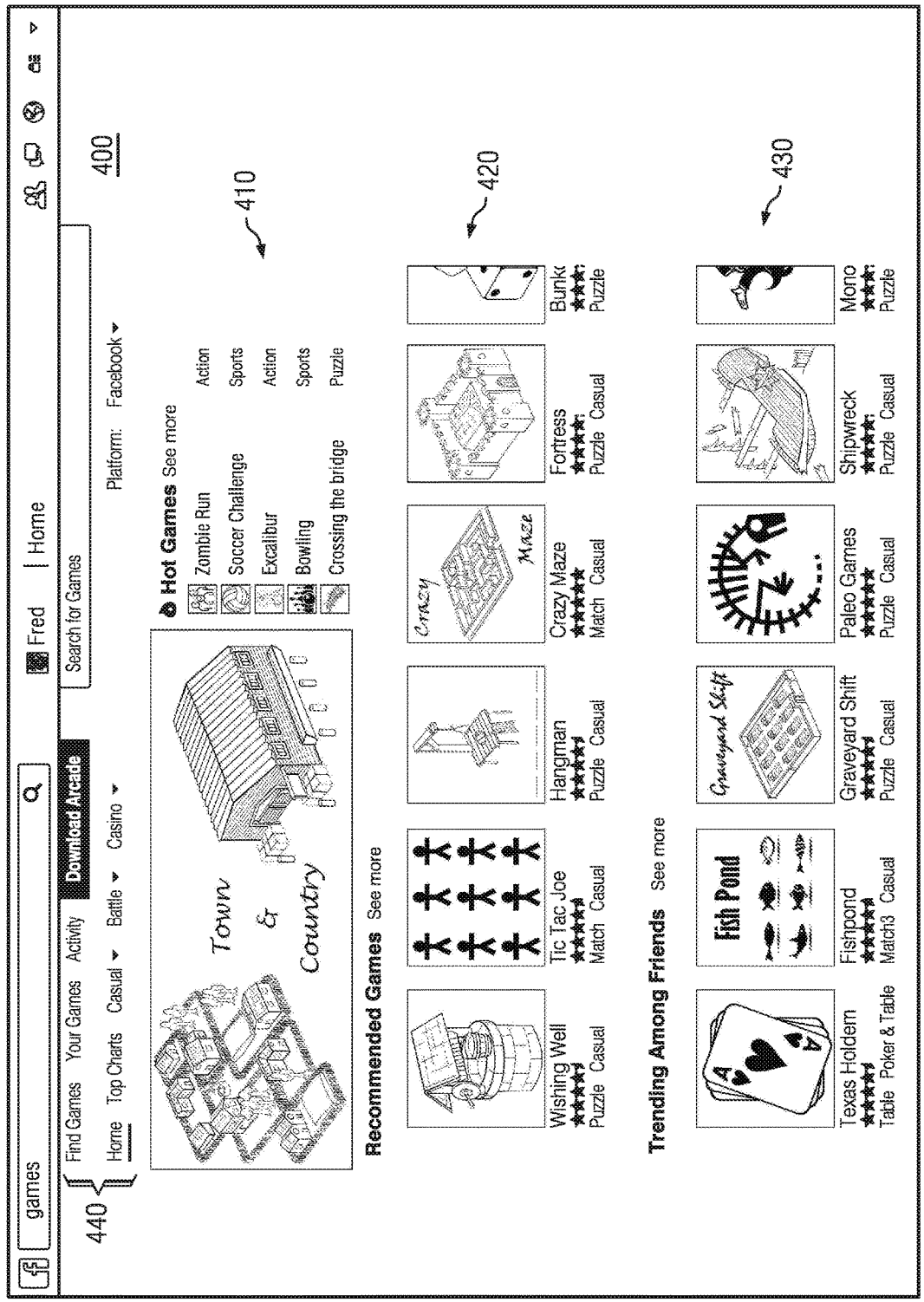
FIG. 4 illustrates an example game center interface displaying recommendations associated with games.

FIG. 4 illustrates an example game center interface displaying recommendations associated with games. In particular embodiments, the social-networking system 160 may provide a game center interface 400 for display on a client system 130 associated with a user. The game center interface 400 may comprise one or more fields, each displaying one or more bookmarks or recommendations. Each of one or more fields of the game center interface may be associated with a particular group of games, which may be generated by the social-networking system 160 based on one or more characteristics of the games. The games within a group may be ranked based on one or more criteria. The position of a particular game within the game center interface 400 may be based at least in part on its rank within a group.

As an example and not by way of limitation, the social-networking system 160 may display one or more recommendations 410 corresponding to one or more games available on the online social network. The recommendations 410 may be displayed under a title "Hot Games." They may each comprise a name of a game (e.g., Zombie Run, Soccer Challenge) and a type or category associated with the game (e.g., Action, Sports). The social-networking system 160 may have selected, grouped, or ranked the games based at least in part on one or more factors indicating the games' popularity among users of the online social network. The viewing user may select one of the recommendations 410 by clicking on its name, which may cause the user to be transferred to an interface associated with the game corresponding to the selected recommendation. The field comprising the recommendations 410 may further comprise a "See more" button, which may be selected by the user to view more games of the same group.

As another example and not by way of limitation, the social-networking system 160 may display one or more recommendations 420 corresponding to one or more games available on the online social network. The recommendations 420 may be displayed under a title "Recommended Games." They may each comprise an image associated with a game, a name of the game, and a type or category associated with the game. The social-networking system 160 may have selected, grouped, or ranked the games based at least in part on a prediction of the viewing user's interests. The viewing user may select one of the recommendations 420 by clicking on its name or image, which may cause the user to be transferred to an interface associated with the game corresponding to the selected recommendation. The field comprising the recommendations 420 may be configured such that the user may swipe it (e.g., with a mouse, with a finger on a touch screen) to view more games of the same group.

As yet another example and not by way of limitation, the social-networking system 160 may display one or more recommendations 430 corresponding to one or more games available on the online social network. The recommendations 430 may be displayed under a title "Trending Among Friends." They may each comprise an image associated with a game, a name of the game, and a type or category associated with the game. The social-networking system 160 may have selected, grouped, or ranked the games based at least in part on one or more factors indicating the games' popularity among the viewing user's friends on the online social network. The viewing user may select one of the recommendations 430 by clicking on its name or image, which may cause the user to be transferred to an interface associated with the game corresponding to the selected recommendation. The field comprising the recommendations 430 may be configured such that the user may swipe it to view more games of the same group.

The game center interface 400 may further comprise a field 440 comprising one or more menu items. The user may select one of the menu items to further explore one or more games that may or may not be currently displayed within the game center interface 400. As an example and not by way of limitation, the user may click on the "Your Games" button to access one or more bookmarks corresponding to one or more games that the user has authorized on the online social network. As another example and not by way of limitation, the user may click on the "Casual" button to view a set of games belonging to the casual games category. Although FIG. 4 illustrates displaying particular selectable representations in a particular user interface in a particular manner, this disclosure contemplates displaying any suitable selectable representations in any suitable user interface in any suitable manner.

Figure 5:
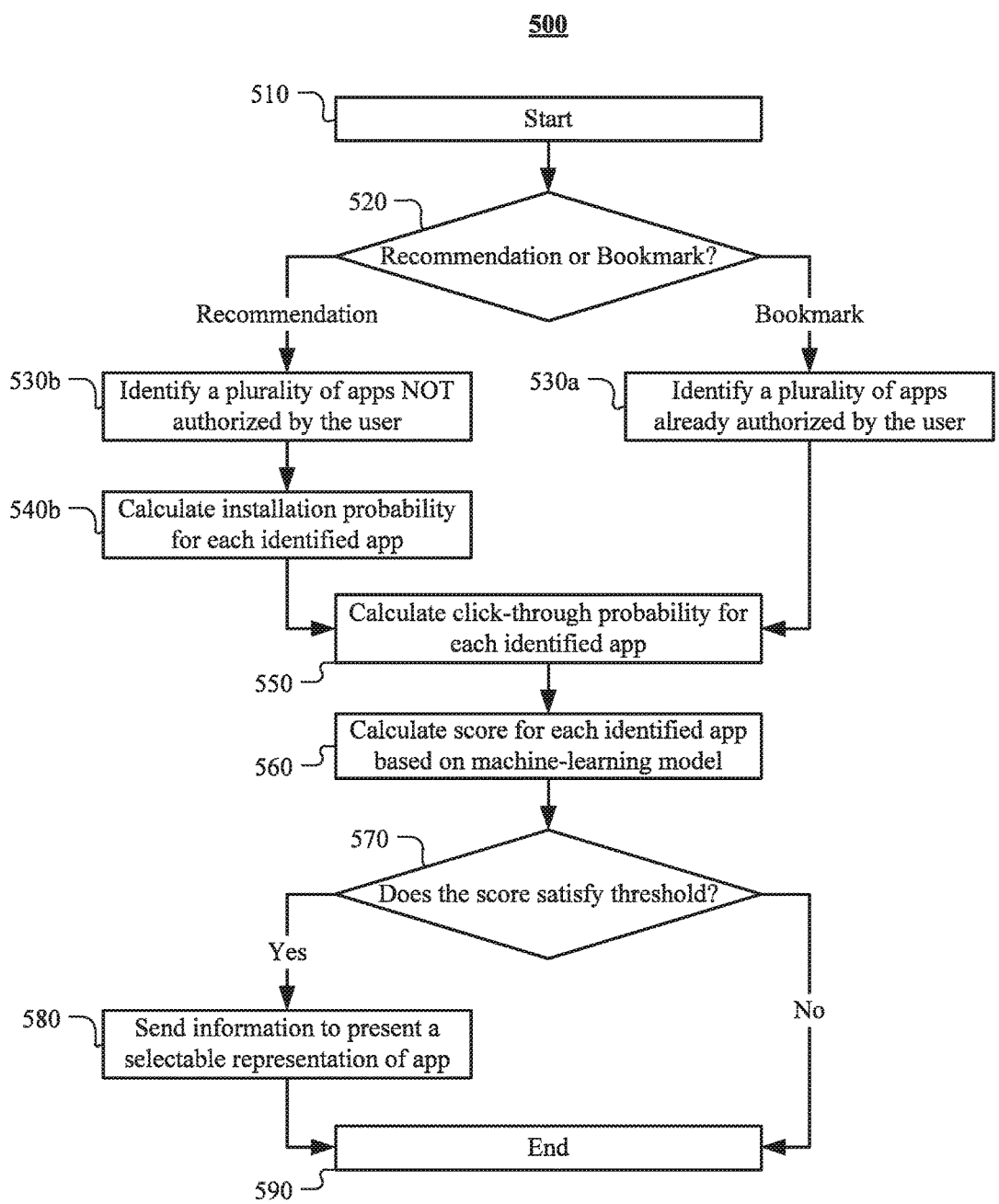
FIG. 5 illustrates an example method for presenting selectable representations associated with one or more applications available on the social-networking system.

FIG. 5 illustrates an example method 500 for presenting selectable representations associated with one or more applications available on the social-networking system 160. The method 500 may begin at step 510, where the social-networking system 160 may start the process. It may, for example, identify a user to whom selectable representations are to be presented or verify that the user has given proper permissions for receiving bookmarks or recommendations associated with applications. At step 520, the social-networking system 160 may choose to execute either the bookmarks service or the recommendations service. As described below, the bookmarks service and the recommendations service according to particular embodiments may share one or more common steps and may involve one or more different steps.

At step 530, the social-networking system 160 may identify a plurality of applications associated with the social-networking system 160 based at least in part on social-networking information for a user. In particular embodiments, the social-networking system 160 may comprise an applications platform making a plurality of applications available to its users. The applications may be developed by the provider of the social-networking system 160 or one or more third-party developers. The applications may be implemented on one or more servers 162 of the social-networking system 160 or one or more servers associated with third-party systems 170. The applications may belong to one or more categories such as, for example, games, news, utilities, shopping, touring, or another suitable category. A user may authorize an application on the online social network. This may cause the application to be added to a profile or account associated with the user or to be "installed" on the social-networking system 160 in association with the user. The application may be displayed to the user upon login to the online social network. The user's authorization may also cause an executable program associated with the application to be downloaded and installed on a client system 130 associated with the user. The social-networking system 160 may store information associated with the applications in one or more data stores 164. Information associated with one or more applications that have been authorized by a user may be stored in association with the user. The social-networking system 160 may search through one or more data stores 164 to identify the applications whose information may be presented to the user.

In particular embodiments, if the bookmarks service is selected at step 520, the social-networking system 160 may identify, at step 530a, a plurality of applications that have already been authorized by the user. The applications may be identified based on data stored in association with the user within one or more data stores 164. The social-networking system 160 may additionally retrieve data associated with a history of the user's interactions with the identified applications.

In particular embodiments, if the recommendations service is selected at step 520, the social-networking system 160 may identify, at step 530b, a plurality of applications that have not been authorized by the user. The applications may be identified from one or more sources. The sources may comprise one or more indexes or lists of applications that may have been pre-generated or generated in real time by the social-networking system 160. Such an index or list may comprise information associated with, for example, one or more popular applications on the online social network (e.g., applications having large numbers of active users), one or more trending applications (e.g., applications having high growth rates in terms of the numbers of active users), one or more popular applications for a demographic group that the viewing user belongs to (e.g., applications having large numbers of English-speaking users for a viewing user who speaks English), one or more popular applications among users of the viewing user's age group (e.g., applications having large number of users between 20 and 30), one or more applications that are determined to be similar to one or more applications currently authorized by the viewing user (e.g., the game Ingress for a user who is playing the game Pokémon Go, both games using augmented reality technology), one or more applications that have been determined to be of interest to the viewing user based on an application-usage history of the user, one or more applications that have recently been made available on the online social network, one or more other suitable applications, or any combination thereof. In particular embodiments, the social-networking system 160 may identify only applications of a particular category (e.g., games, news). Based on particular scenarios, the social-networking system 160 may identify more applications for the recommendations service than for the bookmarks service. This may be consistent with the fact that there are likely to be many more applications that have not been authorized by the user than those that have been authorized.

In particular embodiments, the social-networking system 160 may calculate, using a machine-learning model, a score for each of the identified applications. The score may be calculated based at least in part on a click-through probability that the user will interact with the application upon display of a selectable representation associated with the application. If the bookmarks service is selected at step 520, the social-networking system 160 may calculate, at step 550 for each of the identified applications, a click-through probability that the user will interact with the application upon display of a bookmark associated with the application. It may then calculate, at step 560, a score for the identified application based at least in part on the click-through probability. Alternatively, if the recommendations service is selected at step 520, the social-networking system 160 may similarly calculate, at step 550 for each of the identified applications, a click-through probability that the user will interact with the application upon display of a recommendation associated with the application. But different from the bookmarks service, the social-networking system 160 may further calculate, at step 540b as part of the recommendations service, an installation probability that the user will install the identified application upon interacting with the application. It may then calculate, at step 560, a score for the identified application based at least in part on the click-through probability and the installation probability. In particular embodiments, the social-networking system 160 may use different machine-learning models to calculate a click-through probability and an installation probability. Alternatively, the social-networking system 160 may use a comprehensive machine-learning model which is capable of calculating a click-through probability, an installation probability, and a score for an identified application.

In particular embodiments, a machine-learning model used in either the bookmarks service or the recommendations service for calculating the click-through probability, the installation probability, or the score for an identified application may be based at least in part on one or more features associated with the viewing user or the identified application. The machine-learning model may be supervised or unsupervised. It may have been trained using a training data set. The training data set may comprise historical event information associated with one or more applications and one or more users associated with the social-networking system 160. The training data set may comprise records of a plurality of interactions between the users and the applications. The machine-learning model may apply one or more machine-learning techniques such as, for example, decision tree learning, association rule learning, deep learning, inductive logic programming, reinforcement learning, another suitable machine-learning technique, or any combination thereof. The machine-learning model may be configured to perform one or more functions such as, for example, classification, regression, clustering, another suitable function, or any combination thereof. The machine-learning model may comprise a loss function. The value of the loss function may be minimized when applying the machine-learning model to the training data set.

In particular embodiments, the machine-learning model may be configured to process input feature vectors. A feature vector may be an n-dimensional vector of numerical features representing an object. The feature vector may exist in a feature space. Each dimension of the feature space may correspond to an artificially defined concept or a variable or characteristic derived by the machine-learning model based on the training data set. Each feature vector may be mapped via the machine-learning model to a resulting value. The relationship between the resulting value and the feature vector may be expressed by a linear function, wherein each term of the function corresponds to a term of the feature vector and comprises a coefficient. The relationship between the resulting value and the feature vector may alternatively be expressed by another type of function.

In particular embodiments, the machine-learning model may be configured to treat a user-application pair as an object. The social-networking system 160 may extract one or more features from a feature data set associated with the viewing user with respect to an identified application. The feature data set may be generated based on one or more logs of historical events associated with the user. Here, the feature data set may comprise information about the engagement of one or more users of the social-networking system 160 with one or more applications associated with the social-networking system 160. Specifically, the feature data set may comprise information about a user's reactions to recommendations, notifications, or posted images associated with the applications. It may further comprise information about a user's direct interactions with the applications such as, for example, clicking on an icon associated with an application, installing an application, using an application, playing a game, another suitable way of interaction, or any combination thereof. Here, the users and applications, whose interactions are used to form the feature data set for the viewing user, may have been selected based on their relationships with the viewing user. As an example and not by way of limitation, a selected user may be a friend of the viewing user on the social-networking system 160. As another example and not by way of limitation, a selected application may have been authorized by the viewing user on the social-networking system 160. The social-networking system 160's collection of information for the feature data set may be subject to one or more privacy settings of the one or more users' involved.

In particular embodiments, the features extracted from the feature data set may correspond to one or more concepts artificially defined by developers of the machine-learning model. They may alternatively correspond to one or more variables or characteristics derived by the machine-learning model based on the training data set. The social-networking system 160 may then generate, based on the extracted features, a feature vector for the viewing user with respect to the identified application. In other words, the social-networking system 160 may create a feature vector to describe each user-application pair or each object for the machine-learning model. The features extracted as components of the feature vector may be specifically directed to the bookmarks service or the recommendations service or be generally applicable to one or more other functionalities or services provided by the social-networking system 160. Based on the feature vector, the social-networking system 160 may then calculate a click-through probability, an installation probability, or a score for the viewing user with respect to the identified application using the machine-learning model.

In particular embodiments, the social-networking system 160 may extract from the feature data set one or more user-level features as components of the feature vector associated with the viewing user with respect to an identified application. The user-level features may capture how a user interacts with the social-networking system, a particular application, or a category of applications. These features may be extracted based on real-time as well as historical social-networking information associated with the user. The user-level features may comprise the user's frequency of interacting with applications associated with the social-networking system 160. The determination of this frequency may be made globally considering all data available about the user. Alternatively, the data used may be limited to a particular timeframe or a particular category of applications. As an example and not by way of limitation, the social-networking system 160 may determine a number of times that the user has used any application associated with the social-networking system 160 within a specified period and extract the value as a feature associated with the user. Additionally or alternatively, the social-networking system 160 may determine a frequency at which the user has interacted with applications belonging to the same category as the identified application and extract the frequency as a feature associated with the user. The user's frequency of interacting with one or more applications may be positively correlated with the user's likelihood of being interested in interacting with or installing the identified application.

The user-level features may also comprise a time of the user's most recent interaction with an application associated with the social-networking system 160. This value may be determined for any application associated with the social-networking system 160 or applications belonging to a particular category. As an example and not by way of limitation, the social-networking system 160 may determine the time when the user last played any game associated with the social-networking system 160 and extract this time as a feature associated with the user. If the user has recently been active on the social-networking system 160 by interacting with one or more applications, it may be the case that the user is probably interested in additional interactions with one or more bookmarked or recommended applications. The user-level features may further comprise one or more other suitable features extracted from social-networking information associated with the viewing user.

In particular embodiments, the social-networking system 160 may further extract from the feature data set one or more application-level features as components of a feature vector associated with the identified application. The application-level features may describe a particular application's performance as compared with other applications associated with the social-networking system 160. The application-level features for an application may comprise, for example, a number of daily active users ("DAU") of the application, a number of monthly active users ("MAU") of the application, a growth rate of the application's DAU, a growth rate of the application's MAU, a click-through rate associated with the application among users of the social-networking system 160 fitting a particular demographic description (e.g., gender, country, age), an installation rate associated with the application among users of the social-networking system 160 fitting a particular demographic description, a language supported by the application, another suitable feature, or any combination thereof. The above features may be extracted from one or more event logs associated with the application.

As an example and not by way of limitation, an application may have a DAU of 10,000. A similar application may have a DAU of 1,000. Using features extracted based on the applications' corresponding DAU values, the social-networking system 160 may calculate a higher click-through probability or installation probability for the former application than the latter application. It may be the case that an application with a higher DAU is more popular on the online social network; a user is more likely to be interested in interacting with or installing the application. As another example and not by way of limitation, the DAU for an application may increase at a rate of 5% per month. In contrast, the DAU for another application may decrease at a rate of 5% per month. Using features extracted based on the applications' corresponding DAU growth rates, the social-networking system 160 may calculate a higher click-through probability or installation probability for the former application than the latter application. As yet another example and not by way of limitation, the social networking system 160 may access demographical information associated with the viewing user with proper permissions. It may identify a group of users who belong to a same demographical group as the viewing user and calculate a click-through rate or installation rate of the identified application among the identified group of users. The click-through rate may correspond to a probability that a user having seen information associated with the identified application ends up interacting with the application. The installation rate may correspond to a probability that a user having interacted with the identified application ends up installing the application. A feature extracted based on the click-through rate or the installation rate may be positively correlated with the click-through probability or the installation probability associated with the identified application with respect to the viewing user. As yet another example and not by way of limitation, the social-networking system 160 may determine one or more languages supported by an application and extract such information as a feature. The social-networking system 160 may further determine one or more languages spoken by the viewing user based on profile or other social-networking information associated with the user. Overlap between the languages supported and the languages spoken may positively affect the calculated click-through probability or installation probability.

In particular embodiments, the social-networking system 160 may compute one or more similarity scores between an identified application and a group of other applications, identify a subset of similar applications within the group of other applications based on the computed similarity scores, and extract one or more features of the identified application based on the viewing user's interactions with the identified similar applications. The extracted features may then be fed to a machine-learning model to be used for calculating a click-through probability, an installation probability, or a score associated with the identified application. In addition to user-level features and application-level features, the social-networking system 160 may further extract one or more features for a user-application pair based on one or more similar applications to the identified application. It may be the case that the behavior of a user toward one application is indicative of the user's potential behavior toward a similar application. The social-networking system 160 may compare the identified application with one or more other applications and calculate one or more similarity scores between the applications. The similarity scores may be calculated based on one or more application-related characteristics such as, for example, category, functionality, genre, developer, another suitable characteristic, or any combination thereof. The social-networking system 160 may then identify one or more similar applications based on the similarity scores and extract one or more features based on engagements of one or more users with the identified similar applications. The one or more users may comprise the viewing user or other related users. As an example and not by way of limitation, the identified application may be a game application. The social-networking system 160 may have compared the game application with a plurality of other games; it may have identified or identify in real time one or more other games that are similar to the game application. The identified similar games may belong to the same category as the game application, have similar graphic features to those of the game application, or be developed by the same developer. The social-networking system 160 may then access one or more event logs to obtain a history of the viewing user's previous interactions with the identified similar games and extract one or more features from such a history. For example, the features may comprise a click-through rate of the user with respect to the identified similar games. This feature may be used in the current calculation of the click-through probability, the installation probability, or the score for the identified application.

In particular embodiments, the social-networking system 160 may further extract one or more features based on one or more determined "per-user preferences" associated with the viewing user. The social-networking system 160 may access historical social-networking information associated with the viewing user with proper permissions. The accessed social-networking information may comprise, for example, a game-play history of the user within a specified timeframe, an application-usage history of the user within a specified timeframe, or other suitable social-networking information. The social-networking system 160 may then feed the accessed information into a matrix factorization algorithm, which may return a list of applications that the user is likely to be interested in as results. Each listed application may be associated with a corresponding preference value. A preference value may correspond to an estimated level of interest that the user has in the corresponding application. One or more features may be extracted from the list of applications as well as the applications' preference values. Such features may be used by a ranking algorithm to optimize a machine-learning model. As an example and not by way of limitation, the social-networking system 160 may access the viewing user's social-networking information and determine that the user is likely to be interested in a particular game. This game may be assigned a high preference value accordingly. The social-networking system 160 may include the preference value associated with the game in a feature vector. Based on the feature vector, the social-networking system 160 may calculate a high click-through probability or installation probability for the user with respect to the game.

In particular embodiments, the social-networking system 160 may extract, from the feature data set associated with the viewing user, one or more features directed specifically to the bookmarks service. The information to present selectable representations to the user based on the bookmarks service may each comprise a bookmark to access a corresponding application, which has been authorized by the user. The bookmark-specific features may be particularly relevant in the context that the user has a history of interacting with an identified application. The bookmark-specific features may comprise, for an application identified based on the bookmarks service, a time of the user's most recent interaction with the application, the user's frequency of interacting with the application within a specified timeframe, an amount of time the user spends interacting with the application within a specified timeframe, another suitable feature, or any combination thereof. The above features may be extracted from one or more logs of historical interactions between the user and the identified application. The interactions may be via a web browser 132 on the user's client system 130 displaying an interface associated with the social-networking system 160, via an application associated with the social-networking system 160 that is installed on the user's client system 130, or directly via a program associated with the identified application that is installed on the client system 130, which may be configured to accept login credentials supported by the social-networking system 160.

As an example and not by way of limitation, the most recent interaction between the user and an application may be five minutes ago. The most recent interaction between the user and another application may be two days ago. Using features extracted based on the time points of the user's most recent interactions with the applications, the social-networking system 160 may calculate a higher click-through probability for the former application than for the latter application. It may be the case that a user is likely to interact again with an application with which the user has recently interacted. As another example and not by way of limitation, the user may have interacted with an application thirty times during the past month. The total time the user spent using the application during the past month may be one hour. The user may have only interacted with another application two times during the same period. The total time the user spent using the application may be only ten minutes. Using features extracted based on the frequency and length of time values of the user's interactions with the applications, the social-networking system 160 may calculate a higher click-through probability for the former application than for the latter application. It may be the case that a user is likely to interact again with an application with which the user has interacted frequently or has spent extensive time.

In particular embodiments, the calculation of the click-through probability at step 550 for each of the applications identified at step 530a, which is part of the bookmarks service, may be based on a feature vector associated with the user with respect to the identified application. The feature vector may comprise one or more common features as well as one or more bookmark-specific features as described above. The bookmarks service may comprise a click-through model, which is a machine-learning model configured to map an input feature vector to a value corresponding to a click-through probability. The click-through model may be configured to accept feature vectors comprising the types of features extracted by the social-networking system 160 as input. The click-through model may assign a weight to each feature of the input feature vector. The weight assigned to each feature may be based on a purpose of a machine-learning model. As an example and not by way of limitation, a machine-learning model for the bookmarks service may weigh bookmark-specific features more than other features. As another example and not by way of limitation, a machine-learning model may also adjust the weights assigned to the features based on an interface in which information about one or more identified applications is to be displayed. The click-through probability may correspond to a probability of the occurrence of one or more specified conversion events. The conversion events may comprise, for example, selecting a selectable representation of the identified application, mouseover of an image associated with the identified application, opening the identified application, playing a game associated with the identified application, another suitable conversion event, or any combination thereof. The social-networking system 160 may then calculate, at step 560, a score for the identified application based at least in part on the click-through probability. The calculated score may be stored on one or more data stores 164 associated with the social-networking system 160 for a specified period of time (e.g., two hours). The length of the period may be based on a timeframe within which the calculated score is assumed to be valid. Within the specified period of time, the calculated score may be reused for the same application or one or more other applications.

In particular embodiments, the social-networking system 160 may extract, from the feature data set associated with the viewing user, one or more features directed specifically to the recommendations service. The information to present selectable representations to the user based on the recommendations service may each comprise a recommendation to install a corresponding application, which has not been authorized by the user. The recommendation-specific features may comprise, for an application identified based on the recommendations service, a popularity score for the identified application with respect to a group of users of the social-networking system 160, a growth rate in a number of active users of the identified application, a similarity score for the identified application with respect to one or more other applications used by the user, a user interest score for the identified application with respect to the user based on an application-usage history of the user, a new release timestamp for the identified application on the social-networking system 160, another suitable features, or any combination thereof.

In particular embodiments, the group of users with respect to which the popularity score is calculated may comprise one or more social connections of the viewing user on the online social network, one or more users determined to be similar to the viewing user, one or more users belonging to a demographic group associated with the viewing user, or one or more other suitable users. The popularity score may be calculated based on one or more factors comprising, for example, a number of active users of the identified application who are members of the group, a growth rate of the number of active users of the identified application who are members of the group, an average amount of time that members of the group spent on interacting with the identified application within a specified timeframe, another suitable factor, or any combination thereof. It may be the case that a viewing user is likely to be interested in an application that is popular among other users related to the viewing user.

In particular embodiments, the similarity score may be calculated based on one or more application-related characteristics such as, for example, category, functionality, genre, developer, another suitable characteristic, or any combination thereof. It may be the case that a user is likely to be interested in an application that is similar to other applications that the user has already been using.

In particular embodiments, the user interest score for the identified application may be determined based at least in part on the list of applications that the user is likely to be interested in and the applications' corresponding preference values determined using the matrix factorization algorithm as described above.

In particular embodiments, the social-networking system 160 may search one or more data stores 164 for a release timestamp associated with the identified application. Such a release timestamp may be used by the social-networking system 160 as a feature associated with the identified application. It may be the case that a user is likely to be interested in an application that is newly released.

In particular embodiments, the calculation of the installation probability at step 540*b* and the calculation of the click-through probability at step 550 for each of the applications identified at step 530*b*, which are part of the recommendations service, may be based on a feature vector associated with the user with respect to the identified application. The feature vector may comprise one or more common features as well as one or more recommendation-specific features as described above. In addition to a click-through model, the recommendations service may further comprise an installation model, which is a machine-learning model configured to map an input feature vector to a value corresponding to an installation probability. The click-through model and the installation model used as part of the recommendations service may be configured to accept feature vectors comprising the types of features extracted by the social-networking system 160 as input. The input feature vectors for the installation model may or may not be the same as those for the click-through model. The installation model may assign a weight to each feature of the input feature vector. The weight assigned to each feature may be based on a purpose of a machine-learning model. Specifically, the weights assigned to the features by the click-through model and the installation model may be different due to their different purposes. As an example and not by way of limitation, the installation model may assign a greater weight to a feature extracted from the viewing user's historical activities in installing one or more applications than the click-through model. As another example and not by way of limitation, a machine-learning model for the recommendations service may weigh recommendation-specific features more than other features. The installation probability may correspond to a probability that the user authorizes the identified application upon interacting with the application in response to a recommendation. The social-networking system 160 may then calculate, at step 560, a score for the identified application based at least in part on the click-through probability and the installation probability. In particular embodiments, the score may be calculated at least in part by multiplying the click-through probability by the installation probability associated with the identified application. The product of the click-through probability and the installation probability may correspond to a probability that the user will eventually authorize the identified application on the online social network upon viewing a selectable representation associated with the application. The calculated score may be stored on one or more data stores 164 associated with the social-networking system 160 for a specified period of time (e.g., two hours). The length of the period may be based on a timeframe within which the calculated score is assumed to be valid. Within the specified period of time, the calculated score may be reused for the same application or one or more other applications.

In particular embodiments, for each of the applications identified at step 530, the social-networking system 160 may compare the score calculated at step 560 for the application with a threshold score. At step 570, the social-networking system 160 may determine whether the score of the identified application satisfies the threshold. If the score is determined to satisfy the threshold, the social-networking system 160 may send, at step 580 to a client system 130 of the user for display, information to present a selectable representation associated with the identified application. On the other hand, if the score is determined to not satisfy the threshold, the social-networking system 160 may refrain from sending information associated with the identified application to the user. The method 500 may end at step 590.

In particular embodiments, the selectable representations associated with one or more identified applications may be presented to the user via one or more different delivery channels. The possible delivery channels may comprise, for example, a newsfeed interface, a game center interface, an application center interface, pop-up windows, banner display, sidebars, emails, SMS messages, chat interfaces, another suitable delivery channel, or any combination thereof. An application may specify one or more preferred delivery channels for its bookmarks or recommends. Alternatively, the social-networking system 160 may implement a functionality of determining an optimal delivery channel for sending a particular bookmark or recommendation. The parameters of one or more machine-learning models may be varied for different delivery channels in terms of the features considered and the weights assigned to different features. As an example and not by way of limitation, a machine-learning model may be more optimistic in returning a click-through probability when the delivery channel is a game center interface (e.g., a "high-intent" interface) than if the delivery channel is a newsfeed interface (e.g., a "low-intent" interface). It may be the case that a user is more likely to be interested in learning about games when the user deliberately chooses to visit the game center interface. More information on selecting delivery channels may be found in U.S. patent application Ser. No. 14/567,218, filed 11 Dec. 2014, which is incorporated by reference.

In particular embodiments, the threshold score may have been pre-generated by the social-networking system 160 and stored in a data store 164. Alternatively, the threshold score may be generated in real time. The social-networking system 160 may send a specific number of selectable representations associated with the identified applications to the client system 130 of the user for display. The number of selectable representations may be determined based at least in part on an interface associated with the social-networking system 160 that the user is currently accessing. As an example and not by way of limitation, the social-networking system 160 may send information to display more than one hundred selectable representations to the client system 130 if the user is accessing an application center interface, which is dedicated to the display of information about applications. In contrast, the social-networking system 160 may send information to display less than ten selectable representations to the client system 130 if the user is accessing a newsfeed interface, which comprises one or more small sidebars for displaying information about applications. In particular embodiments, the social-networking system 160 may dynamically generate the threshold score based on the number of selectable representations to be sent. It may generate a high threshold score if the number of selectable representations to be sent is limited. Alternatively, the social-networking system 160 may rank the identified applications based at least in part on their corresponding scores and identify one or more top-ranked applications. It may only send information to present selectable representations associated with the identified top-ranked applications to the client system 130. In particular embodiments, the social-networking system 160 may order the selectable representations associated with one or more identified applications within an interface based at least in part on the calculated score for each of the identified applications. The selectable representations may similarly be organized based at least in part on the ranks of their corresponding applications. A selectable representation corresponding to an application with a high score or rank may be displayed at a more noticeable position within the interface.

In particular embodiments, a selectable representation corresponding to an identified application may comprise, for example, a name of the application, a category or type of the application, an index number associated with the application, a description of the application, an image asset associated with the application, other suitable content, or any combination thereof. The image asset associated with the application may be received from a third-party system 170 associated with the application. The image asset may be selected by the social-networking system 160 using a machine-learning model based on one or more features associated with the user, the identified application, or one or more available assets associated with the application. More information on selecting image assets may be found in U.S. patent application Ser. No. 15/215,922, filed 21 Jul. 2016, which is incorporated by reference. In particular embodiments, the social-networking system 160 may generate, as part of the bookmarks service, an icon for an identified application that has been authorized by the user based on one or more image assets associated with the application. The icon may be stored in one or more data stores 164 associated with the social-networking system 160. The social-networking system 160 may further identify a particular position within a particular interface for displaying a selectable representation of the application. The social-networking system 160 may display a bookmark associated with the application comprising the generated icon at the identified position in a consistent way to provide the user convenient and confusion-free access to the application. The social-networking system 160 may optimize the generated icon and the identified position for the application based on one or more feedback algorithms. One or more of the feedback algorithms may be based on the user's historical interactions with particular icons displayed at particular positions.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for presenting selectable representations associated with one or more applications available on the social-networking system 160 including the particular steps of the method of FIG. 5, this disclosure contemplates any suitable method for presenting selectable representations associated with one or more applications available on the social-networking system 160 including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

In particular embodiments, the social-networking system 160 may detect one or more actions taken by the viewing user upon display of one or more selectable representations and modify one or more of the machine-learning models based on the detected actions. After sending a selectable representation to the user's client system 130 for display, the social-networking system 160 may detect and log the user's activities in response to the selectable representation. Such detecting and logging may be subject to one or more privacy settings associated with the user. The activities logged may comprise mouseover of the selectable representation, clicking on the selectable representation, installing the application associated with the selectable representation, closing the interface displaying the selectable representation after a certain amount of time, closing the same interface immediately, another detectable activity, or any combination thereof. The social-networking system 160 may store information about the logged activities as one or more event logs of the application associated with the selectable representation or as social-networking information of the user. Such stored information may be added to the training data set for a machine-learning model. The machine-learning model may periodically be refined or developed using the updated training data set. The stored information may additionally or alternatively be added to one or more feature data sets associated the user or the application. The stored information may thereby affect the extraction of features and calculation of click-through probabilities or installation probabilities in the future.

In particular embodiments, the social-networking system 160 may apply one or more speed optimization techniques to improve the efficiency of the bookmarks service or the recommendations service. The speed optimization techniques may comprise caching one or more types of information client-side or server-side. The cached information may comprise one or more lists of applications including, for example, a list of applications that are currently authorized by the user or one or more friends of the user on the online social network, a list of popular games on the online social network, a list of recommended applications for a demographic group associated with the viewing user, one or more other lists of applications, or any combination thereof. Caching such information may enhance the efficiency of the social-networking system 160 in identifying applications that may be presented to the user.

In particular embodiments, the cached information may also comprise one or more features that can be extracted from historical data associated with a user or an application. Such features may comprise, for example, a user's frequency of interacting with applications associated with the social-networking system 160 within the past week, an application's MAU, a language supported by an application, another suitable feature, or any combination thereof. The social-networking system 160 may also cache one or more features that depend on data associated with real-time user activities (e.g., features associated with one or more applications recently installed by the user). For those features, the social-networking system 160 may re-calculate and re-cache the features as soon as relevant user activities are detected. Caching features may enhance the efficiency of the social-networking system 160 in calculating scores for identified applications.

In particular embodiments, the cached information may further comprise one or more selectable representations associated with one or more applications. The selectable representations may each be stored in association with one or more interfaces associated with the social-networking system 160. The social-networking system 160 may quickly present such cached selectable representations to a user when the user accesses a particular interface. The social-networking system 160 may periodically or dynamically update the cached selectable representations. The frequency of updates for a particular cached selectable representation may be based on a type of the selectable representation or an interface on which it is to be displayed. As an example and not by way of limitation, the social-networking system 160 may update a bookmark more frequently (e.g., every five seconds) than a recommendation. In case a user installs or uninstalls an application on the online social network, it may be desirable for the bookmarks displayed to the user to immediately react to such changes. On the other hand, the social-networking system 160 may update cached recommendations at a lower frequency as they are not as time-sensitive. As another example and not by way of limitation, the social-networking system 160 may frequently update one or more selectable representations cached in association with an interface that the user visits frequently (e.g., a newsfeed interface). It may update the selectable representations cached in association with an interface that the user does not often visit (e.g., a game center interface) less frequently.

Figure 6:
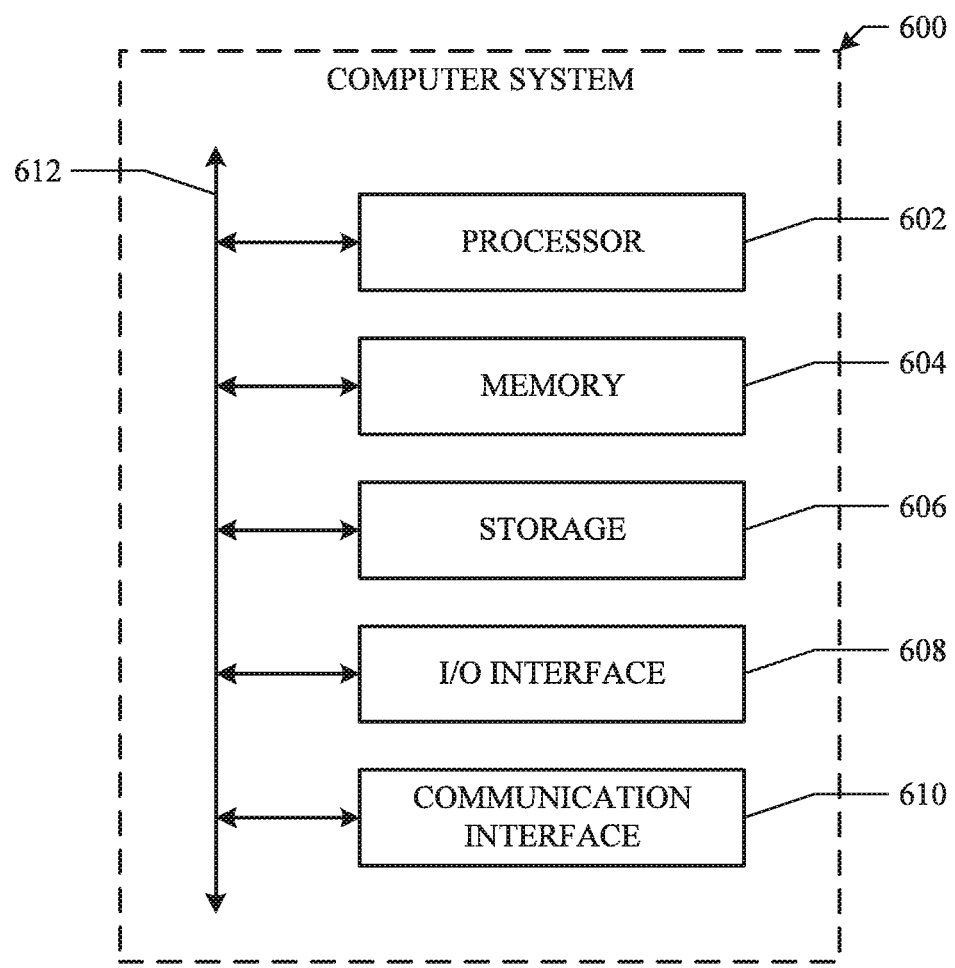
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    identifying a plurality of applications based at least in part on a social-networking system based at least in part on social-networking information for it user associated with the social-networking system, wherein one or more of the applications are implemented on one or more servers of the social-networking system and accessible through a user interface associated with the social-networking system;
    calculating, using machine-learning model and for each of the identified applications, a score based at least in part on a click-through probability that the user will interact with the identified application upon display of a selectable representation associated with the identified application, wherein the machine-learning model is based at least in part on one or more features associated with the user or one or more features associated with the identified application; and
    sending, to a client device of the user for display, information to present a selectable representation associated with each of one or more of the identified applications based at least in part on the score for the application wherein the selectable representation comprises a bookmark to access an identified application that has been authorized by the user on the social-networking system.

2. The method of claim 1, wherein the features comprise:
    the user's frequency of interacting with applications associated with the social-networking system, wherein the frequency is assessed within a specified timeframe;
    the user's frequency of interacting with applications associated with the social-networking system, wherein the applications fall within a particular category;
    a time of the User's most recent interaction with any application associated with the social-networking system; or
    a time of the user's most recent interaction with an application associated with the social-networking system, wherein the application fails within a particular category.

3. The method of claim 1, wherein the features comprise, for each of the identified applications;
    a number of daily active users of the identified application;
    a number of monthly active users of the identified application;
    a growth rate of the identified application's number of daily active users;
    a growth rate of the identified application's number of monthly active users;
    a click-through rate associated with the identified application among users of the social-networking system fitting a particular demographic description;
    an installation rate associated with the identified application among users of the social networking system fitting a particular demographic description; or
    a language supported by the identified application.

4. The method of claim 1, wherein the information to present the selectable representation comprises a recommendation to install the identified application associated with the selectable representation, and wherein the features of the identified application comprise:
    a popularity score for the identified application with respect to a group of users of the social-networking system;
    a growth rate in a number of active users of the identified application;
    a similarity score for the identified application with respect to one or more other applications used by the user;
    a user interest score for the identified application with respect to the user based on an application-usage history of the user; or
    a new release timestamp for the identified application on the social-networking system.

5. The method of claim 4, wherein the score for each of the identified applications is further based on an installation probability that the user will install the identified application upon interacting with the identified application.

6. The method of claim 5, wherein the calculating the score for each of the identified applications comprises multiplying the click-through probability by the installation probability.

7. The method of claim 1, wherein the features comprise, for each of the identified applications:
    a time of the user's most recent interaction with the identified application;
    the user's frequency of interacting with the identified application within a specified timeframe; or
    an amount of time the user spends interacting with the identified application within, a specified timeframe.

8. The method of claim 1, further comprising, for each of the identified applications:

computing one or more similarity scores between the identified application and a group of other applications;

identifying a subset of similar applications within the group of other applications based on the computed similarity scores;

extracting one or more features of the identified application based on the user's interactions with the identified similar applications; and feeding the extracted features to the machine-learning model to be used for calculating the score associated with the identified application.

9. The method of claim 1, further comprising:

sending, the client device of the user, a number of selectable representations of the identified applications, wherein the number is determined based at least in part on an interface associated with the social-networking system that the user is currently accessing.

10. The method of claim 1, wherein the information to present the selectable representation associated with one of the identified applications comprises an image asset received from a server associated with the identified application.

11. The method of claim 1, further comprising:

detecting one or more actions taken by the user upon display of one or more selectable representations; and modifying the machine-learning model based on the detected actions.

12. The method of claim 1, wherein the score for each of the identified applications is based on the click-through probability and an installation probability that the user will install the identified application upon interacting with the application, and wherein the method of claim 1 further comprises ordering the selectable representations associated with the identified applications based at least in part on the calculated score for each of the identified applications.

13. One or inure computer-readable non-transitory storage media embodying software that is operable when executed to:

identify a plurality of applications associated with a social-networking system based at least in part on social-networking information for a user associated with the social-networking system, wherein one or more of the applications are implemented on one or more servers of the social-networking system and accessible through a user interface associated with the social-networking system;

calculate, using a machine-learning model and for each of the identified applications, a score based at least in part on a click-through probability that the user will interact with the identified application upon display of a selectable representation associated with the identified application, wherein the machine-learning model is based at least in part on one or more features associated with the user or one or more features associated with the identified application; and send, to a client device of the user for display, information to present a selectable representation associated with each of one or more of the identified applications based at least part on the score for the application, wherein the selectable representation comprises a bookmark to access an identified application that has been authorized by the user on social-networking system.

14. The media of claim 13, wherein the information to present the selectable representation comprises a recommendation to install the identified application associated with the selectable representation, and wherein the features of the identified application comprise;

a popularity score for the identified application with respect to a group of users of the social-networking system;

a growth rate in a number of active users of the identified application;

a similarity score for the identified application with respect to one or more other applications used by the user;

a user interest score for the identified application with respect to the user based on an application-usage history of the user; or a new release timestamp for the identified application on the social-networking system.

15. The media of claim 13, wherein the software is further operable when executed to:

detect one or more actions taken by the user upon display of one or more selectable representations; and modify the machine-learning model based on the detected actions.

16. A system comprising: one or more processors; and a memory coupled to the processors comprising instructions executable b the processors, the processors being operable when executing the instructions to:

identify a plurality of applications associated with a social-networking system based at least hi part on social-networking information for a user associated with the social-networking system, wherein one or more of the applications are implemented on one or more servers of the social-networking system and accessible through a user interface associated with the social-networking system;

calculate, using a machine-learning model and for each of the identified applications, a score based at least in part on a click-through probability that the user will interact with the identified application upon display of a selectable representation associated with the identified application, wherein the machine-learning model is based at least in part on one or more features associated with the user one or more features associated with the identified application; and send, to a client device of the user for display, information to present a selectable representation associated with each of one or more of the identified applications based at least in part on the score for the application, wherein the selectable representation comprises a bookmark to access an identified application that has been authorized by the user on the social-networking system.

17. The system of claim 16, wherein the information to present the selectable representation comprises a recommendation to install the identified application associated with the selectable representation, and wherein the features of the identified application comprise:

a popularity score for the identified application with respect to a group of users of the social-networking system;

a growth rate in a number of active users of the identified application;

a similarity score for the identified application with respect to one or more other applications used by the user;

a user interest score for the identified application with respect to the user based on an application-usage history of the user; or a new release timestamp for the identified application on the social-networking system.

* * * * *